United States Patent [19]
Wahlgren et al.

[11] 3,836,821
[45] Sept. 17, 1974

[54] GROUND FAULT PROTECTIVE SYSTEM

[75] Inventors: Wallace W. Wahlgren, Oakland; Ellwood S. Douglas, Orinda, both of Calif.

[73] Assignee: The Rucker Company, Oakland, Calif.

[22] Filed: Mar. 12, 1973

[21] Appl. No.: 340,169

Related U.S. Application Data

[63] Continuation-in-part of Ser. No. 141,297, May 7, 1971, abandoned.

[52] U.S. Cl. .......................... 317/18 D, 317/33 SC
[51] Int. Cl. ................................................ H02h 3/16
[58] Field of Search ............ 317/18 D, 27 R, 33 SC, 317/141 S, 50; 330/110, 23

[56] References Cited
UNITED STATES PATENTS

| | | | |
|---|---|---|---|
| 3,213,321 | 10/1965 | Dalziel | 317/18 D |
| 3,259,803 | 7/1966 | Battista | 317/50 |
| 3,392,352 | 7/1968 | White | 317/141 S |
| 3,505,566 | 4/1970 | Conrad | 317/27 R |
| 3,558,980 | 1/1971 | Florance | 317/18 D |
| 3,611,035 | 10/1971 | Douglas | 317/18 D |

*Primary Examiner*—J. D. Miller
*Assistant Examiner*—Patrick R. Salce
*Attorney, Agent, or Firm*—Flehr, Hohbach, Test, Albritton & Herbert

[57] ABSTRACT

Highly sensitive ground fault protective system utilizing an operational amplifier, integrator and switching means for interrupting the flow of current in a distribution system when the amplified and integrated signal produced by a fault current reaches a sharply defined threshold value. The system can be built in highly miniaturized, modular form which can be incorporated in small circuit breakers and receptacle outlet boxes.

21 Claims, 4 Drawing Figures

INVENTORS
WALLACE W. WAHLGREN
ELLWOOD S. DOUGLAS
BY Flehr, Hohbach, Vest,
Albritton & Herbert
ATTORNEYS

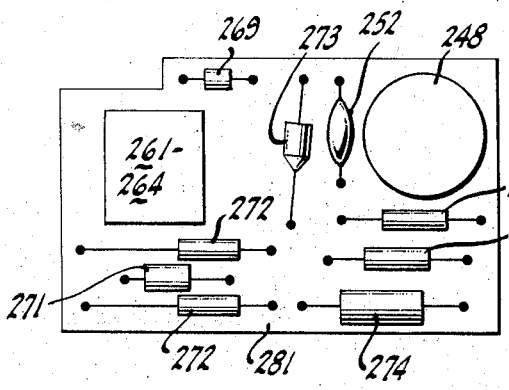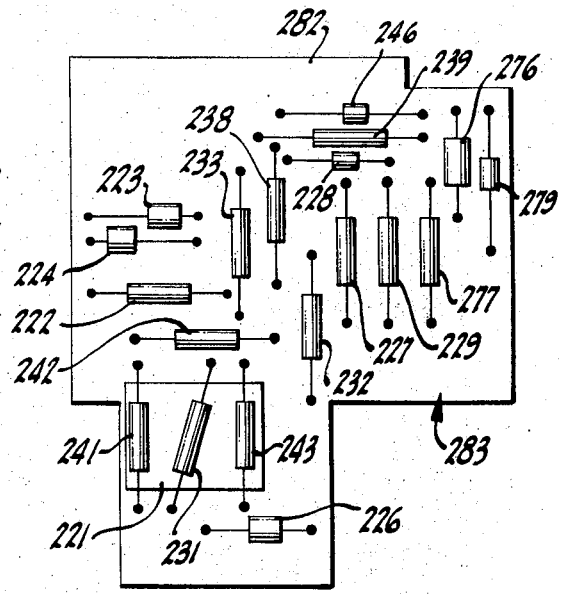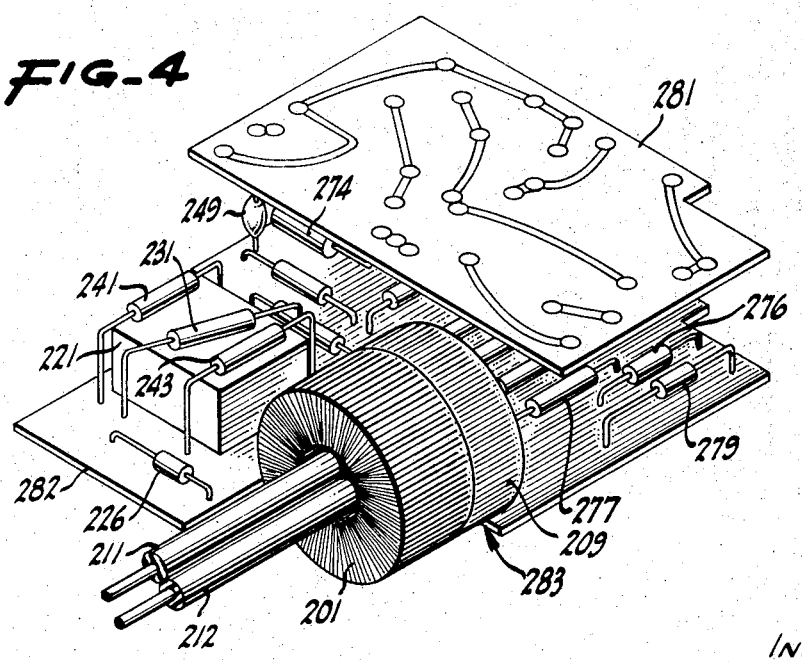

GROUND FAULT PROTECTIVE SYSTEM

CROSS-REFERENCE TO RELATED APPLICATIONS

This application is a continuation-in-part of Ser. No. 141,297, filed May 7, 1971, now abandoned.

BACKGROUND OF THE INVENTION

This invention pertains generally to electrical safety devices and more particularly to a sensitive ground fault protective system which can be constructed in highly miniaturized, modular form.

Ground fault interrupters utilizing differential transformers for detecting ground fault currents have been known for several years. The sensitivity of such devices is, to a large extent, dependent upon the size of the differential transformer. A device having sufficient sensitivity for the protection of human life might, for example, require a differential transformer of a size on the order of a baseball. Such devices are not suitable for incorporation in small assemblies such as circuit breakers of the type used in panelboards and receptacle outlet boxes.

Heretofore, there have been some attempts to increase the sensitivity of the ground fault interrupter and reduce the size of the differential transformer by amplifying the output of the transformer. Such attempts have not produced entirely satisfactory results in several respects. For example, the amplifier tends to amplify noise and transient disturbances as well as the signal produced by the fault current. This can result in false tripping or interruption of the current when there is no ground fault. Also, when one attempts to miniaturize these amplified systems, problems of instability and temperature compensation are encountered.

There is therefore, a need for a new and improved highly sensitive, miniaturized ground fault protective system which overcomes the foregoing and other problems which have been encountered with ground fault interrupters heretofore provided.

SUMMARY AND OBJECTS OF THE INVENTION

In the ground fault protective system of the present invention, the output of the differential transformer is amplified by an operational amplifier. The output of this amplifier is integrated, and the output of the integrator is applied to electronic switching means having a sharply defined threshold level. The switching means is arranged for controlling the operation of the contacts of an interrupter having its operating coil connected in series with the power supply of the system. A pulse generator is provided for inducing a pulse current in the neutral conductor to prevent the system from being rendered inoperable by grounding of that conductor at the load. This pulser is connected to the output of the power supply in such manner that it serves as a voltage regulator for the power supplied to the rest of the system. The entire system can be constructed in a highly miniaturized modular form which is particularly suitable for use in combination with small electrical devices such as circuit breakers and receptacle outlet assemblies.

It is, in general, an object of the present invention to provide a new and improved ground fault protective system.

Another object of the invention is to provide a ground fault protective system of the above character which can be constructed in highly miniaturized form.

Additional objects and features of the invention will be apparent from the following description in which the preferred embodiment is set forth in detail in conjunction with the accompanying drawings.

BRIEF DESCRIPTION OF THE DRAWINGS

FIG. 2 is a top plan view of one embodiment of a printed circuit board assembly containing a first portion of the system illustrated in FIG. 1.

FIG. 3 is a top plan view of a printed circuit board assembly containing a second portion of the system illustrated in FIG. 1.

FIG. 4 is a perspective view of the printed circuit board assemblies of FIGS. 2 and 3 connected together to form a highly miniaturized embodiment of the ground fault protective system shown in FIG. 1.

DESCRIPTION OF THE PREFERRED EMBODIMENTS

Figure 1:
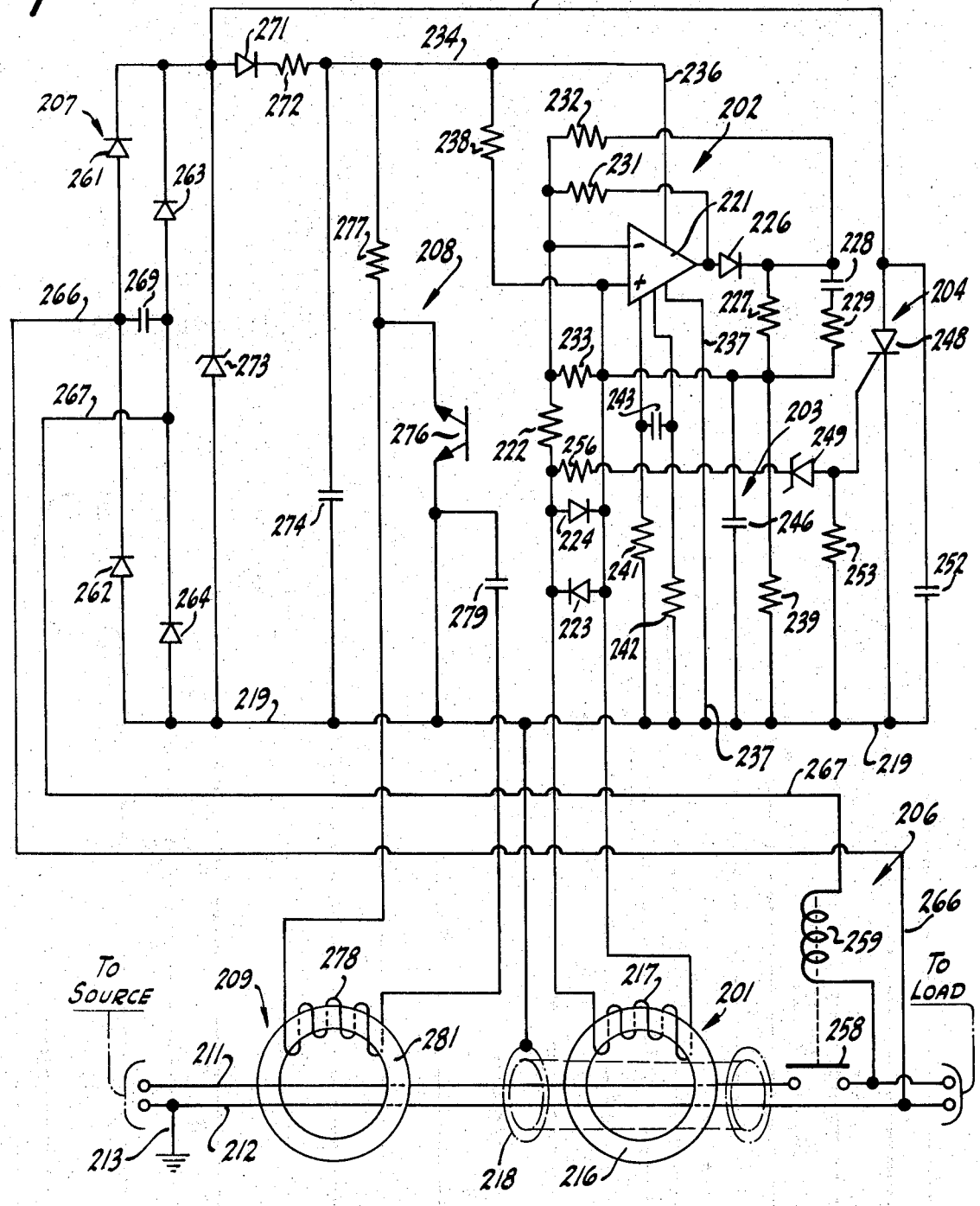
FIG. 1 is a schematic diagram of one embodiment of a ground fault protective system incorporating the present invention.

The ground fault protective system of the present invention includes a differential transformer 201 for monitoring the flow of current in a distribution system, amplifier means 202 for amplifying the output of the differential transformer, integrator means 203 for integrating the output of the amplifier, switching means 204 for energizing an interrupter 206 when the integrated output of the amplifier reaches a predetermined level, a power supply 207, and a pulse generator 208 and coupling transformer 209 which prevent the system from being defeated by grounding of the neutral conductor at the load.

The system is shown in connection with a distribution system having a line conductor 211 and a neutral conductor 212 which carry current between a source and a load. The neutral conductor is connected to ground at its source end, as indicated at 213. The protective system can be utilized with either single phase or polyphase power distribution systems having one or more line conductors and a neutral conductor which is connected to ground at its source end.

The differential transformer 201 includes a toroidal core 216 which is fabricated of a material having a relatively high magnetic permeability. The conductors 211 and 212 pass through this core to form single turn primary windings. A multiple turn secondary winding 217 is wound on the core, and in one presently preferred embodiment this winding has 1,000 turns. The conductors 211 and 212 are arranged in such manner that equal currents flowing through them produce a zero net magnetic flux in the toroidal core 216 and a zero output signal in the secondary winding 217. When the currents in the conductors are not equal, a non-zero net magnetic flux is produced in the core 216, and a fault signal is produced in the secondary winding 217. An electrostatic shield 218 is provided between the conductors 211, 212 and the toroidal core 216. This shield is electrically insulated from the conductors 211, 212 and the secondary winding 217, and it is connected electrically to a common conductor 219 in the protective system.

The amplifier means 202 includes an operational amplifier 221. One end of the secondary winding 217 of the differential transformer is connected to the inverting input of this amplifier through an input resistor 222. The other end of the secondary winding is connected to the noninverting input of the operational amplifier. A pair of oppositely polarized diodes 223 and 224 are connected across the secondary winding 217 to protect the input of the operational amplifier from being damaged by excessively large fault signals.

The output of the operational amplifier 221 is connected to the anode of a diode 226. A load resistor 227 is connected between the cathode of this diode and the noninverting input of the amplifier. A capacitor 228 and a resistor 229 are connected in series with each other across the load resistor 227 to provide an increased load at higher frequencies.

Temperature compensation for operational amplifier 221 is provided by feedback resistors 231 and 232 in conjunction with diode 226. Resistor 231 is connected between the anode of the diode and the inverting input terminal of the operational amplifier, and resistor 232 is connected between the cathode of the diode and the inverting input. The amount of feedback is determined by the parallel resistance of the feedback resistors, and the amount of temperature compensation is determined by the ratio of these resistors. In one preferred embodiment, the feedback resistors are chosen to provide sufficient feedback to reduce the gain of the operational amplifier from a gain on the order of 1,000 to a gain on the order of a few hundred, and the ratio of the resistors is adjusted to stabilize the amplifier. This arrangement has been found to provide unusually good temperature stability in a ground fault system operating over the wide range of temperatures.

If desired, other temperature sensitive elements can be used in place of diode 226, provided that another diode or rectifying element is connected in series with resistor 227 to detect the amplified signal. Other suitable elements include thermistors and other temperature sensitive resistors. Likewise, the temperature compensation can be increased by utilizing another diode or other temperature sensitive device in series with diode 226 and resistor 232.

A resistor 233 is connected between the inverting and noninverting inputs of the operational amplifier 221. This resistor serves to suppress an undesired mode of amplification which would otherwise result from the action of the diode 226. During the positive half cycle of the output of the operational amplifier, negative feedback is provided through both of the feedback resistor 231 and 232, but during the negative half cycle such feedback occurs only through the resistor 231. Thus, with the feedback resistors approximately equal in value, the amount of feedback and, consequently, the gain of the amplifier would vary by a factor of approximately two between the positive an negative half cycles. The secondary winding 217 of the differential transformer would act as a voltage doubler, tending to overcome the difference in gain. This type of amplification is relatively unstable, and the resistor 233 is included to suppress it.

As is discussed more fully hereinafter, the power supply 207 provides a source of voltage between a conductor 234 and the common conductor 219, with the conductor 234 being positive relative to the common conductor. Operating power is supplied to the operational amplifier 221 by means of leads 236 and 237 which are connected from the appropriate terminals of the operational amplifier to the positive conductor 234 and the common conductor 219, respectively. A resistor 238 is connected between the positive conductor 234 and the noninverting input of the operational amplifier, and a resistor 239 is connected between the noninverting input and the common conductor 219. These resistors are chosen to have values which bias the noninverting input to the level required for proper operation of the operational amplifier. Typically, this level is on the order of a few volts positive relative to the negative supply voltage, that is a few volts positive relative to the common conductor 219.

Input offset resistors 241 and 242 are shown connected between the input offset terminals of the operational amplifier and the common conductor 219. The values of these resistors are chosen to provide the desired input offset voltage, and with many operational amplifiers one of these resistors can be eliminated. A capacitor 243 is connected between the input offset terminals to suppress noise and reduce the effects of stray capacitance from conductors 211 and 212 which are relatively large noise sources.

The integrating means 203 includes a capacitor 246 which is connected for being charged by the output of the operational amplifier. One side of this capacitor is connected to the junction of the load resistors 227, 229 and the noninverting input terminal of the amplifier, and the other side of the capacitor is connected to the common conductor 219. The resistor 239, which helps to set the biasing level of the noninverting input, also serves as a bleeder on the integrated capacitor.

The switching means 204 includes a silicon controlled rectifier 248 and a zener diode 249. As is discussed more fully hereinafter, the anode of the SCR 248 is connected directly to the unregulated output of the power supply 207 by a lead 251. The cathode of the SCR is connected to the common conductor 219, and a capacitor 252 is connected between the anode and cathode of the SCR. This capacitor tends to suppress transient disturbances originating in the power distribution system. The anode of the zener diode 249 is connected to the gate of the SCR, and a resistor 253 is connected between the gate and the common conductor 219. The cathode of the zener diode is connected to the integrator capacitor 246 through a resistor 256 and the secondary winding 217 of the differential transformer. The zener diode determines the level to which the capacitor 246 must be charged to fire the SCR. In the preferred embodiment this diode has a zener voltage of 16 volts.

The interrupter means 206 includes a set of contacts 258 and an operating coil 259. The contacts 258 are normally closed, and they are connected in series with the line conductor 211. These contacts are adapted for opening to interrupt the flow of current in the conductor when the coil 259 is energized. If desired, similar sets of contacts can be provided in the neutral conductor 212 and/or in additional line conductors in the distribution system.

The power supply means 207 receives a.c. input power from the distribtuion system and delivers d.c. operating power to the remainder of the protective system. This means includes a full-wave bridge rectifier consisting of diodes 261–264. One input of the rectifier bridge is connected to the neutral conductor 212 by a lead 266, and the other input terminal of the bridge is connected to one end of the operating coil 259 by a lead 267. The other end of this coil is connected to the line conductor 211. The normal operating current drawn by the protective system is less than the minimum value required to energize the coil 259 to open the contacts 258. A capacitor 269 is connected between the two input terminals of the rectifier bridge. This capacitor cooperates with the coil 259 to form an effective filter for suppressing transient disturbances from the distribution system. The negative output terminal of the rectifier bridge is connected to the common conductor 219, and the positive output terminal of this bridge is connected to the positive conductor 234 through a diode 271 and a current limiting resistor 272. To conserve space, the resistor 272 can consist of two or more small wattage resistors connected in series. The lead 251, which carries current to the anode of the SCR 248, is connected to the positive output terminal of the rectifier bridge ahead of the diode 271. A zener diode 273 is connected between the output terminals of the rectifier bridge. This diode provides means for suppressing surges in the distribution system voltage to prevent false tripping of the interrupter in response to such surges. This diode has a breakdown or zener voltage higher than the voltage in the distribution system and the output of the rectifier bridge. For example, with an r.m.s. voltage of 120 volts in the distribution system, the unfiltered output of the rectifier bridge would have a peak voltage on the order of 170 volts, and the zener diode 273 might have a breakdown voltage on the order of 200 volts. A filter capacitor 274 is connected across the output of the power supply between the positive conductor 234 and the common conductor 219.

The pulse generator or pulser 208 includes a bilateral switching device 276, commonly known as a diac. A resistor 277 is connected between the positive conductor 234 and one terminal of the diac. The junction of the resistor and the diac terminal is connected to one end of a multiple turn winding 278 on the coupling transformer 209. The other end of this winding is connected to the second terminal of the diac through a capcitor 279. The junction of the capacitor and second terminal is connected to the common conductor 219.

The coupling transformer 209 provides means for coupling the output of the oscillator 208 to the line and neutral conductors. This transformer includes a toroidal core 281 which is fabricated of a material having a high magnetic permeability. The winding 278 is wound on this core, and the line and neutral conductors pass through it.

The pulser 208 serves a dual function. First, it produces a continuous series of pulses which are coupled to the line and neutral conductors to provide grounded neutral protection and protection against shorting of the line conductor to an unprotected conductor. Second, it regulates the output of the power supply at a voltage level corresponding to the firing level of the diac. In the preferred embodiment, the diac has a firing voltage on the order of 32 volts, and the oscillator regulates the voltage between the positive conductor 234 and the common conductor 219 at a level on the order of 32 to 38 volts, as is more fully discussed hereinafter.

Although a pulse generator such as the pulser 208 is the presently preferred type of oscillator for use in the present invention, other types of oscillators can be used if desired. Such an oscillator might, for example, produce a sinusoidal signal having a frequency on the order of a few kilohertz. Because of its short duty cycle, the pulser has one important advantage over a continuous wave oscillator in that it requires substantially less power for operation.

Operation and use of the protective system shown in FIG. 1 can be described briefly. In the absence of a ground fault, the currents in the line and neutral conductors 211, 212 produce a zero net magnetic flux in the differential transformer core 216 and a zero output signal in the secondary winding 217. The output of the operational amplifier 221 is also zero, and the voltage across the integrating capacitor 246 remains at the level to which the noninverting input of the operational amplifier is biased. Since this level is below the breakdown voltage of the zener diode 249 which controls the firing of the SCR 248, the SCR remains turned off. In this situation, the current drawn from the power supply 207 is less than the value which will energize the interrupter coil 259, and the contacts 258 remain closed.

When a ground fault occurs, the currents in the line and neutral conductors 211, 212 are no longer balanced, and a fault signal is produced in the differential transformer secondary winding 217. This fault signal is amplified by the operational amplifier, and the amplified fault signal is rectified by the diode 226 and then applid to the integrating capacitor 246 through the load resistor 227. When the capacitor 246 is charged to the level determined by the breakdown voltage of the zener diode 249, the SCR 248 fires, substantially increasing the current drawn from the power supply 207. This increase in current energizes the coil 259 to the point where the contacts 258 open, interrupting the flow of current in the distribution system.

The pulser 208 operates continuously. The capacitor 279 is charged by current flowing through the resistor 277 and the coupling transformer winding 278 which functions as an inductor. When the voltage across the capacitor 279 and the inductor 278 reaches the firing voltage of the diac 276, the diac fires, discharging the capacitor 279 through the inductor 278. When the charge on the capacitor 279 falls below the minimum value for maintaining the diac in its conductive state, the diac turns off. The charge on the capacitor 279 then begins to charge again with current from the resistor 277, and the cycle repeats. The voltage pulse generated in the inductor 278 is coupled to the line and neutral conductors by the transformer 209. If the neutral conductor becomes grounded on the load side of the differential transformer 201, a pulse current is induced in this conductor by the transformer 209. This current flows through the neutral conductor to ground on the load side of the differential transformer and back to the neutral conductor through the ground connection at the source end of this conductor. This pulse current produces a current imbalance in line and neutral conductor which is sensed by the differential transformer and results in the contacts 258 being opened. Similarly, a pulse current will be induced in the line conductor 211 if this conductor should become shorted to an unprotected conductor or if it should become shorted to itself on both sides of the protective system.

The pulse width and repetition rate are determined by the values of the resistor 277 and the capacitor 279, the inductance of the winding 278, the firing voltage of the diac 276 and the output voltage of the power supply 207. In the preferred embodiment, these values are chosen to provide a repetition rate substantially greater than the frequency of the current in the distribution system. This rate varies somewhat with the output voltage of the rectifier bridge, but this variation is not detrimental to the operation of the system. The values of the capacitor 228 and resistor 229 in the output of the amplifier are chosen to pass the pulse frequency. Thus, these components bypass the load resistor 227 and increase the sensitivity of the system to the pulse current.

The manner in which the pulser regulates the output of the power supply can now be described briefly. Without the pulser connected to the power supply, the voltage across the filter capacitor 274 would be substantially equal to the peak output voltage of the rectifier bridge, i.e. on the order of 170 volts. However, the action of the diac 276 prevents the voltage from reaching this value. The values of the resistor 277 and capacitor 279 are chosen to be such that the diac fires each time the voltage on the filter capacitor 274 builds up to about 32 volts. When the diac fires, the filter capacitor is discharged through the resistor 277 and the diac. The diac turns off when the voltage on the capacitor 274 drops to approximately 29 volts. Thus, the voltage on the filter capacitor is regulated at a level between 29 and 32 volts.

The system shown in FIG. 1 provides reliable interruption in response to very small fault currents, and it is relatively immune to false tripping. In the preferred embodiment, the gain of the operational amplifier 221, the values of the components in the integrator 203, and the breakdown voltage of the zener diode 249 are chosen so that the SCR 248 will fire, interrupting the flow of current in the distribution circuit, in response to fault currents as small as 4 ma. or less. The use of the zener diode in series with the gate of the SCR provides a higher threshold voltage and a more sharply defined firing level than would otherwise be possible. The action of the integrator 203 is such that larger fault currents require less time to produce tripping than do smaller fault currents. The bleeder resistor 239 prevents small disturbances, such as noise, from building up on the integrator capacitor 246 and causing fale tripping. The interrupter coil 259 and the capacitors 269 and 252 provide an effective filter for preventing transient disturbances in the distribution system from causing false tripping, and the zener diode 273 further prevents false tripping due to large transients, such as line surges.

The ground fault protective system of the present invention can be constructed in a highly miniaturized modular form, as illustrated in FIGS. 2–4. In this form of construction, the components in the power supply 207 and switching means 204 are mounted on a first printed circuit board 281, and the components associated with the amplifier means 202, integrator 203 and pulser 208 are mounted on a second printed circuit board 282. The printed circuit board 281 is approximately 1¼ inches long and ¾ inch wide, and the overall dimensions of the board 282 are approximately 1¼ inches by 1½ inches, with a portion of this board being notched away, as indicated at 283. The components mounted on each of the circuit boards are connected together electrically to form the circuits shown in FIG. 1 by means of conductive foil on the sides of the boards opposite the components.

The circuit boards 281 and 282 are mounted together in an overlying relationship, with the component sides of the boards facing each other, as illustrated in FIG. 4. The components on the two boards are arranged in such manner that they do not interfere with each other when the boards are together. In the embodiment illustrated, the boards are separated by approximately ⅝ inch. The zener diode 249 is mounted between the boards. The differential transformer 201 and coupling transformer 209 each have a diameter on the order of 1–2 cm, and these transformers are located in the cutaway region 283 of the circuit board 282. Transformers of this size are suitable for use with line and neutral conductors carrying load currents up to approximately 30 amperes in a single phase system. With higher load currents and/or polyphase systems, somewhat larger transformers could be used to accommodate the conductors.

The assembly including the circuit boards 281, 282 and the transformers 201, 209 can be encapsulated in a potting compound, such as epoxy resin, to provide a rugged modular unit. The interrupter means 206 is located externally of this unit.

It is apparent from the foregoing that a new and improved ground fault protective system has been provided. The system is highly sensitive and particularly suitable for protecting human life against electrical shock. Its operation is reliable, and the entire system can be constructed in highly miniaturized form. While only the presently preferred embodiment has been described, as will be apparent to those familiar with the art, certain changes and modifications can be made without departing from the scope of the inention as defined by the following claims.

We claim:

1. In a ground fault protective device for use in connection with an electrical distribution system having line and neutral conductors carrying electrical energy between a source and a load, the neutral conductor being connected to ground at the source, a differential transformer having a plurality of primary windings and a secondary winding, said primary windings being connected in a series with the conductors of the distribution system and arranged for producing a fault signal in said secondary winding when the currents flowing to and from the load through the line and neutral conductors are not equal, means for amplifying the fault signal, integrator means for producing a trip signal having a magnitude corresponding to the magnitude and duration of the amplified fault signal, switching means connected to the output of said integrator means and adapted for actuation when the magnitude of said trip signal reaches a predetermined level, interrupter means having an operating coil and normally closed contacts for interrupting the flow of current in the distribution system conductors, said coil requiring a predetermined minimum current for opening said contacts, and power supply means for receiving input current from the distribution system conductors and delivering operating current to the remainder of the protective device, said operating coil being connected between one of the conductors and the power supply means whereby the input current passes through said coil, said input current normally being less than the predetermined minimum but increasing to said minimum upon actuation of the switching means.

2. In a ground fault protective device for use in connection with an electrical distribution system having line and neutral conductors carrying electrical energy between a source and a load, the neutral conductor being connected to ground at the source, a differential transformer having a plurality of primary windings and a secondary winding, said primary windins being connected in series with the conductors of the distribution system and arranged for producing a fault signal in said secondary winding when the currents flowing to and from the load through the line and neutral conductors are not equal, highly sensitive amplifier means comprising an operational amplifier having its input connected for receiving the fault signal from said secondary winding, integrator means connected to the output of said amplifier means for producing a trip signal having a magnitude corresponding to the magnitude and duration of said fault signal, switching means connected to the output of said integrator means and adapted for closing when the magnitude of said trip signal reaches a predetermined level, and temperature compensation means comprising a first feedback resistor connected between the output and the inverting input of the operational amplifier, a temperature dependent conductive element having one terminal connected to the output of the operational amplifier, and a second feedback resistor connected between the other terminal of the temperature dependent element and the inverting input of the operational amplifier.

3. A ground fault protective device as in claim 2 together with a set of normally closed breaker contacts connected in series with at least one of said conductors and means controlled by said switching means for opening said contacts in response to the fault signal.

4. A ground fault protective device as in claim 2 wherein said amplifier means comprises an operational amplifier.

5. A ground fault protective device as in claim 2 wherein said integrator means includes a capacitor connected for being charged by the output of said amplifier means and a resistor connected for discharging said capacitor at a predetermined rate.

6. A ground fault protective device as in claim 2 wherein said switching means includes a solid state switching device and a zener diode connected between the output of the integrator means and the control element of said switching device.

7. A ground fault protective device as in claim 2 together with power supply means connected for receiving an a.c. input from the distribution system conductors and delivering d.c. operating power to the remainder of said device, said power supply means including means for suppressing surges from the distribution system voltage to prevent false tripping of the device in response to such surges.

8. In a ground fault protective device for use in connection with an electrical distribution system having a plurality of conductors carrying electrical energy between a source and a load, one of said conductors being connected to ground at source, means for monitoring the flow of current in the conductors and producing a fault signal when the currents flowing to and from the load through said conductors are not equal, interrupter means including an operating coil and contacts for interrupting the flow of current in the distribution system conductors, said coil requiring a predetermined minimum level of current for opening said contacts, power supply means connected for receiving input current from the distribution system conductors and delivering operating current to the protective device, said operating coil being connected between one of said conductors and said power supply means in such manner that the input current passes through said operating coil, said input current normally being less than the predetermined minimum level, and switching means for increasing the input current to the predetermined minimum level in response to the fault signal.

9. A ground fault protective device as in claim 2 wherein the temperature dependent element is a diode.

10. A ground fault protective device as in claim 2 further including means for providing an additional current in the neutral conductor in the event that said conductor is grounded remotely of the source.

11. In a highly miniaturized ground fault protective device for use in connection with an electrical distribution system having line and neutral conductors carrying electrical energy between a source and a load, the neutral conductor being connected to ground at the source, a differential transformer having a toroidal core with a diameter on the order of 1 to 2 cm for load currents up to about 30 amperes, a plurality of single turn primary windings connected in series with the conductors of the distribution system and passing through the opening in said core, and a secondary winding on said core, said primary windings being arranged in such manner that a fault signal is produced in said secondary winding when the currents flowing to and from the load through the line and neutral conductors are not equal, and operational amplifier having its input connected for receiving the fault signal from said secondary winding, a capacitor connected for being charged by the output of said operational amplifier, switching means connected to said capacitor and adapted for closing when the charge on said capacitor reaches a predetermined level, a second toroidal core of small size surrounding the neutral conductor, oscillator means connected to a winding on said second core for inducing a high frequency signal on the neutral conductor in the event that said conductor is grounded remotely of the source, and temperature compensation means comprising a first feedback resistor connected between the output and one input of the operational amplifier, a temperature dependent resistive element having one terminal connected to the output of the operational amplifier, and a second feedback resistor connected between the other terminal of the temperature dependent element and said one input of the operational amplifier.

12. A highly miniaturized ground fault protective device as in claim 11 wherein said switching means includes a silicon controlled rectifier and a zener diode connected between said capacitor and the gate of said silicon controlled rectifier.

13. In a ground fault protective device for use in connection with an electrical distribution system having line and neutral conductors carrying electrical energy between a source and a load, wherein the neutral conductor is connected to ground at the source, a differential transformer having a plurality of primary windings and a secondary winding, said primary windings being connected in series with the conductors of the distribution system and arranged for producing a fault signal in said secondary winding when the currents flowing to and from the load through the line and neutral conductors are not equal, interrupter means including an operating coil and contacts for interrupting the flow of current in the distribution system conductors, said coil requiring a predetermined minimum level of current for opening said contacts, power supply means connected for receiving input current from the distribution system conductors and delivering operating current to the protective device, said operating coil being connected between one of said conductors and said power supply means in such manner that the input current flows through said operating coil, and switching means responsive to said fault signal, said switching means being connected to said power supply means in such manner that when said switching means is closed the input current is at least as great as said predetermined minimum level.

14. In a ground fault protective device for use in connection with an electrical distribution system having line and neutral conductors carrying electrical energy between a source and a load, wherein the neutral conductor is connected to ground at the source, a differential transformer having a plurality of primary windings and a secondary winding, said primary windings being connected in series with the conductors of the distribution system and arranged for producing a fault signal in said secondary winding when the currents flowing to and from the load through the line and neutral conductors are not equal, means responsive to said fault signal for interrupting the flow of current in the distribution system conductors, power supply means connected for receiving a.c. input current from the distribution system conductors and delivering d.c. operating current to the protective device, and oscillator means coupled to the neutral conductor in the distribution system for inducing a high frequency signal in said conductor, said oscillator means including a switching element which fires when the voltage across its terminals reaches a predetermined level, said switching element being connected to the output of said supply means in such manner that it regulates the output voltage of said supply means at a value corresponding to said predetermined level.

15. In a ground fault protective device for use in connection with an electrical distribution system having line and neutral conductors carrying electrical energy between a source and a load, the neutral conductor being connected to ground at the source, a differential transformer having a plurality of primary windings and a secondary winding, said primary windings being connected in series with the conductors of the distribution system and arranged for producing a fault signal in said secondary winding when the currents flowing to and from the load through the line and neutral conductors are not equal, highly sensitive amplifier means having its input connected for receiving the fault signal from said secondary winding, integrator means connected to the output of said amplifier means for producing a trip signal having a magnitude corresponding to the magnitude and duration of said fault signal,
  switching means connected to the output of said integrator means and adapted for closing when the magnitude of said trip signal reaches a predetermined level, power supply means connected for receiving an input current from the distribution system conductors and delivering d.c. operating power to the remainder of said device, said power supply means including means for suppressing surges from the distribution system voltage to prevent false tripping of the device in response to such surges, and interrupter means connected for interrupting the flow of current in at least one of said conductors, said interrupter means including an operating coil responsive to currents of a predetermined minimum level, said operating coil being connected in series between one of said conductors and one input of said power supply means so that the input current to said power supply means passes through said coil, said switching means being connected to the output of said power supply means in such manner that when said switching means is closed the current passing through said operating coil reaches said predetermind minimum level.

16. In a ground fault protective device for use in connection with an electrical distribution system having line and neutral conductors carrying electrical energy between a source and a load, the neutral conductor being connected to ground at the source, a differential transformer having a plurality of primary windings and a secondary winding, said primary windings being connected in series with the conductors of the distribution system and arranged for producing a fault signal in said secondary winding when the currents flowing to and from the load through the line and neutral conductors are not equal, highly sensitive amplifier means having its input connected for receiving the fault signal from said secondary winding, integrator means connected to the output of said amplifier means for producing a trip signal having a magnitude corresponding to the magnitude and duration of said fault signal, switching means connected to the output of said integrator means and adapted for closing when the magnitude of said trip signal reaches a predetermined level, power supply means connected fore receiving an a.c. input from the distribution system conductors and delivering d.c. operating power to the remainder of said device, said power supply means including means for suppressing surges from the distribution system voltage to prevent false tripping of the device in response to such surges, interrupter means connected for interrupting the flow of current in at least one of said conductors, said interrupter means including an operating coil responsive to currents of a predetermined minimum level, said operating coil being connected in series between one of said conductors and one input of said power supply means so that the input current to said power supply means passes through said coil, and a shunt capacitor connected across the input of said power supply means, said operating coil and said shunt capacitor together forming a low pass filter to protect the device from high frequency transient disturbances arising in the distribution system.

17. In a ground fault protective device for use in connection with a system having a plurality of conductors carrying current between a source and a load, one of said conductors being connected to ground at the source, means for monitoring the flow of current in the conductors and producing a fault signal when the currents flowing to and from the load through the conductors are not equal, means including an operational amplifier for amplifying the fault signal, and temperature compensation means comprising a first feedback resistor connected between the output and the inverting input of the operational amplifier, a diode having one terminal connected to the output of the operational amplifier, and a second feedback resistor connected between the other terminal of said diode and the inverting input of the operational amplifier.

18. In a ground fault protective device for use in connection with an electrical distribution system having line and neutral conductors carrying eletrical energy between a source and a load, the neutral conductor being connected to ground at the source, a differential transformer having a plurality of primary windings and a secondary winding, said primary windings being connected in series with the conductors of the distribution system and arranged for producing a fault signal in said secondary winding when the currents flowing to and from the load through the line and neutral conductors are not equal, highly sensitive amplifier means having its input connected for receiving the fault signal from said secondary winding, integrator means connected to the output of said amplifier means for producing a trip signal having a magnitude corresponding to the magnitude and duration of said fault signal, switching means connected to the output of said integrator means and adapted for closing when the magnitude of said trip signal reaches a predetermined level, and means for producing an additional current in the neutral conductor in response to grounding of said conductor remotely of the source, said means for producing an additional current in the neutral conductor including a pulse generator having its output coupled to said conductor through a transformer, said generator including a switching element which fires when the voltage across its terminals reaches a predetermined level and thereafter conducts until the current flowing through it decreases to a predetermined level, said generator also including a capacitor connected to said switching element and thereafter discharging through said switching element, said switching element being connected to the remainder of said protective device in such manner that it serves as a voltage regulator for the operating power supplied to said device.

19. In a highly miniaturized ground fault protective device for use in connection with an electrical distribution system having line and neutral conductors carrying electrical energy between a source and a load, the neutral conductor being connected to ground at the source, a differential transformer having a toroidal core with a diameter on the order of 1 to 2 cm for load currents up to about 30 amperes, a plurality of a single turn primary windings connected in series with the conductors of the distribution system and passing through the opening in said core, and a secondary winding when the currents flowing to and from the load through the line and neutral conductors are not equal, an operational amplifier having its input connected for receiving the fault signal from said secondary winding, a capacitor connected for being charged by the output of said operational amplifier, switching means connected to said capacitor and adapted for closing when the charge on said capcitor reaches a predetermined level, a second toroidal core of small size surrounding the neutral conductor, oscillator means connected to a winding on said second core for inducing a high frequency signal on the neutral conductor, and power supply means for receiving a.c. power from the distribution system conductors and supplying d.c. operating power to the protective device, said oscillator means being connected to the output of said power supply means and including a bilateral switching element which fires when the voltage across its terminals reaches a predetermined level, said switching element serving to regulate the output voltage of said power supply means at a level corresponding to said predetermined level.

20. A highly miniaturized ground fault protective device as in claim 1 wherein said bilateral switching element is a diac.

21. A highly miniaturized ground fault protective device as in claim 19 wherein said power supply means includes means for suppressing surges in the distribution system voltage to prevent false tripping in response to such surges, said means for suppressing surges comprising a zener diode connected across the output of said power supply means, said zener diode having a breakdown voltage higher than the normal peak voltage in the distribution system and higher than the normal output voltage of said supply means.

* * * * *